United States Patent
Guri et al.

(10) Patent No.: US 11,086,993 B2
(45) Date of Patent: Aug. 10, 2021

(54) SYSTEM AND METHOD FOR PERFORMING ON-CLOUD MEMORY ANALYSIS, FORENSIC AND SECURITY OPERATIONS ON CONNECTED DEVICES

(71) Applicant: B. G. NEGEV TECHNOLOGIES AND APPLICATIONS LTD., AT BEN-GURION UNIVERSITY, Beer Sheva (IL)

(72) Inventors: Mordechai Guri, Modi'in (IL); Yuval Elovici, D.N. Lachish (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 63 days.

(21) Appl. No.: 16/083,346

(22) PCT Filed: Mar. 7, 2017

(86) PCT No.: PCT/IL2017/050277
§ 371 (c)(1),
(2) Date: Sep. 7, 2018

(87) PCT Pub. No.: WO2017/153983
PCT Pub. Date: Sep. 14, 2017

(65) Prior Publication Data
US 2019/0095620 A1    Mar. 28, 2019

Related U.S. Application Data

(60) Provisional application No. 62/304,958, filed on Mar. 8, 2016.

(51) Int. Cl.
*H04L 29/06*    (2006.01)
*G06F 21/56*    (2013.01)
(Continued)

(52) U.S. Cl.
CPC .......... *G06F 21/565* (2013.01); *G06F 21/567* (2013.01); *H04L 63/145* (2013.01);
(Continued)

(58) Field of Classification Search
CPC ............ H04L 63/1416; H04L 63/1408; H04L 63/1441; H04L 63/1458; G06F 21/552
(Continued)

(56) References Cited

U.S. PATENT DOCUMENTS 8,904,525 B1    12/2014  Hodgman et al.
2006/0236393 A1*  10/2006  Kramer ................. H04L 63/145
                                                                726/23
(Continued)

OTHER PUBLICATIONS

Extended Search Report for European Patent Application No. 17762634.8 dated Sep. 30, 2019.
(Continued)

*Primary Examiner* — Evans Desrosiers
(74) *Attorney, Agent, or Firm* — FisherBroyles, LLP; Robert Kinberg

(57) ABSTRACT

The invention relates to a system for protecting IoT devices from malicious code, which comprises: (a) a memory extracting module at each of said IoT devices, for extracting a copy of at least a portion of the memory content from the IoT device, and sending the same to an in-cloud server; and (b) an in-cloud server for receiving said memory content, and performing an integrity check for a possible existance of malicious code within said memory content.

12 Claims, 1 Drawing Sheet

(51) Int. Cl.
  *H04W 4/70*    (2018.01)
  *H04L 29/08*   (2006.01)
(52) U.S. Cl.
  CPC ............... *H04L 67/12* (2013.01); *H04W 4/70* (2018.02); *G06F 2221/034* (2013.01); *G06F 2221/2115* (2013.01)
(58) Field of Classification Search
  USPC ......................................................... 726/23
  See application file for complete search history.

(56)         References Cited

U.S. PATENT DOCUMENTS

| | | |
|---|---|---|
| 2007/0277241 A1 | 11/2007 | Repasi et al. |
| 2013/0019306 A1* | 1/2013 | Lagar-Cavilla ....... G06F 21/566 726/22 |
| 2013/0111547 A1 | 5/2013 | Kraemer |
| 2013/0227636 A1 | 8/2013 | Bettini et al. |
| 2014/0047544 A1 | 2/2014 | Jakobsson |
| 2017/0061131 A1* | 3/2017 | Santos .................. H04L 63/123 |

OTHER PUBLICATIONS

International Search Report for PCT/IL2017/050277 dated Jun. 14, 2017.
Written Opinion for PCT/IL2017/050277 dated Jun. 14, 2017.

* cited by examiner

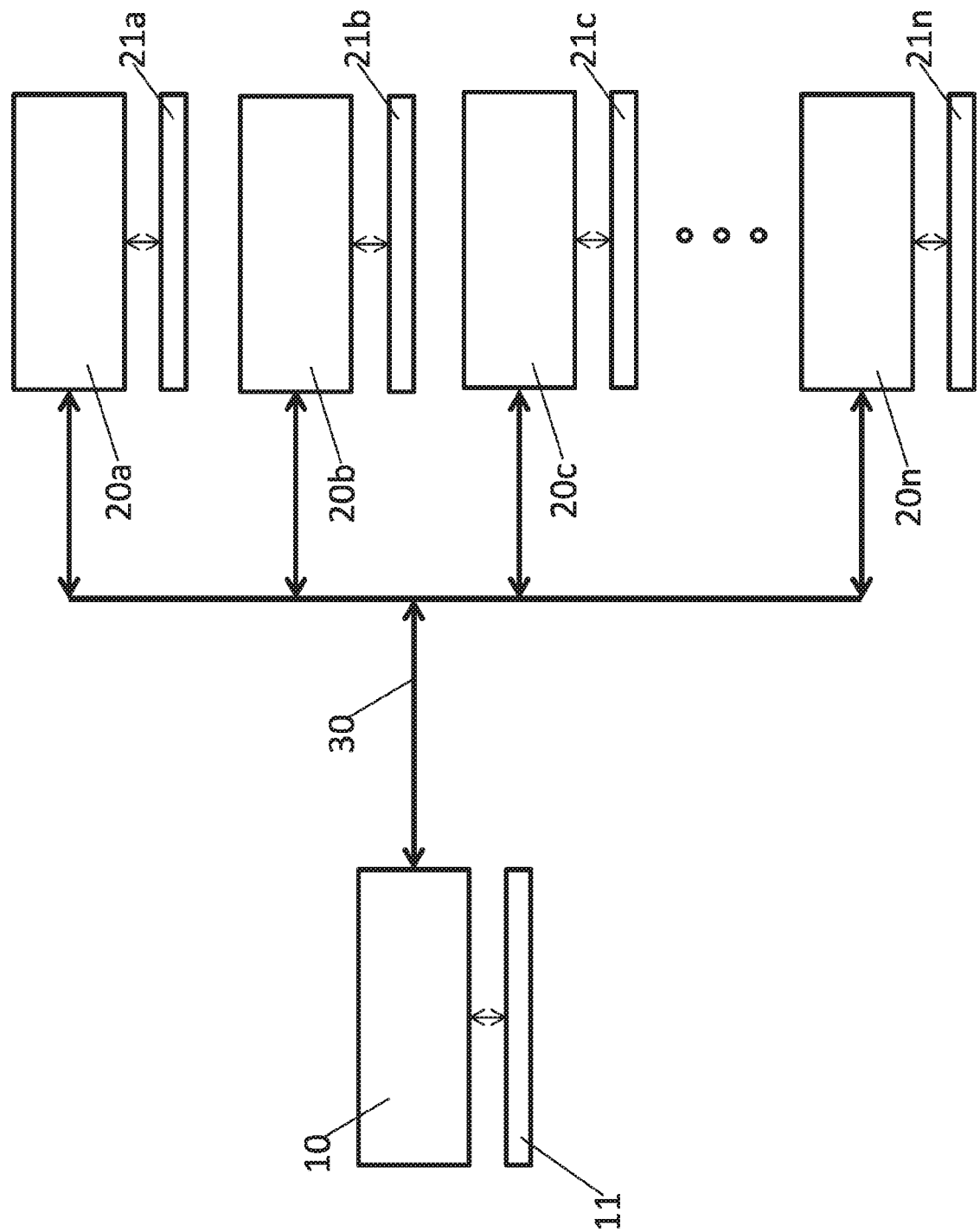

SYSTEM AND METHOD FOR PERFORMING ON-CLOUD MEMORY ANALYSIS, FORENSIC AND SECURITY OPERATIONS ON CONNECTED DEVICES

FIELD OF INVENTION

The field of the invention relates in general to methods and systems for securing computerized environments and devices. More specifically, the invention relates to a method and a system for checking the integrity and authenticity of "Internet of Things" (IoT) type devices, thereby detecting whether they have been infected by malicious code.

BACKGROUND OF THE INVENTION

The "Internet of Things (IoT)" is the internetworking of physical devices, vehicles (also referred to as "connected devices" and "smart devices"), buildings, and other items embedded with electronics, software, sensors, actuators, and network connectivity that enable these objects to collect and exchange data. The IoT allows objects to be sensed or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of the more general class of cyber-physical systems, which also encompasses technologies such as smart homes, intelligent transportation and smart cities. Each thing is uniquely identifiable through its embedded computing system and is able to interoperate within the existing Internet infrastructure. According to Wikipedia, Experts estimate that the IoT will consist of almost 50 billion objects ("things") by 2020.

Typically, IoT offers advanced connectivity of devices, systems, and services that goes beyond machine-to-machine (M2M) communications and covers a variety of protocols, domains, and applications. The interconnection of these embedded devices (including smart objects), is expected to be adopted in in nearly all fields of automation.

For example, the range of IoT devices includes heart monitoring implants, biochip transponders on farm animals, electric clams in coastal waters, automobiles with built-in sensors, or field operation devices that assist firefighters in search and rescue operations. These devices use sensors to collect useful data with the help of various existing technologies, and then autonomously flow the data between other devices. Other examples include home automation (smart home devices) such as the control and automation of lighting, heating (like smart thermostat), ventilation, air conditioning (HVAC) systems, and appliances such as washer/dryers, robotic vacuums, air purifiers, ovens or refrigerators/freezers that use Wi-Fi for remote monitoring.

As discussed, the IoT devices that are used in many fields and structures, are manufactured by a huge number of different manufacturers. While the protocol for interconnectivity and communication between various of these device has been defined and standartized, still a vast majority of these devices are characterized by:

a. They apply a great variety of proprietary operating systems (OS), software and hardware;
b. They have a limited, in many cases very limited processing power; and
c. The devices are in many cases very cheap.

Although the IoT devices are typically characterized by said (a)-(c) above, still these devices in many cases are used to control or sense very critical elements. The exploitation of these devices by hostile entities, for example, by injection of malicious code, can cause very significant damages, such as stealing of data, manipulation of the operation of the devices, or using the attacked device as a platform for attacking other device (e.g., bot). Therefore, in contrast to (a) the low cost of each of said devices; (b) the fact that the devices may have a very limited processing power; and (c) the fact that each of the devices may have a different proprietary oprating system that may require a dedicated protection software; there is still a real need to protect the IoT devices from damages resulting from malicious code. This is particularly due to the fact that all these devices are accessible to hackers via the Internet.

The prior art techniques that have been so far adopted for protecting IoT devices from malicious code are typically tradional, for example:

a. Use of a firewall, which substantially isolates the internal network of the IoT devices from the external domain;
b. The use of conventional anti-virus software, whenever possible. This is, however, impractical in IoT devices having proprietary operating systems, in view of the huge variety of the proprietary operating systems involved. Furthermore, this is in many cases impractical in view of the high difference between the value of the IoT device and the cost of developing such software to account for this large variety of proprietary operating systems. Finally, the limited processing power of the IoT devices does not always enable the use of anti-virus software.
c. The use of network based security systems such as firewalls, Intrusion Detection Systems (IDS) and Intrusion Prevention Systems (IPS). These systems are monitoring the network traffic and try to detect attacks or malicious activities. However, this approach is limited only to attacks that can be detect from the network traffic. Moreover, this approach is very limited in detecting attacks that are hiding within encrypted traffic.

More specifically, the prior art has typically applies the classic approach that is typically used for end-points and workstations, which involves running detection programs on the IoT devices to detect, scan and analyze for malicious code within the (1) persistent storage (e.g., disk) and (2) non-persistent storage (e.g., memory).

However, this approach is not applicable in many case, in view of the limited computational power of the IoT device.

In another aspect, cloud computing is a type of Internet-based computing that provides shared computer processing resources and data to computers and other devices on demand. It is a model for enabling ubiquitous, on-demand access to a shared pool of configurable computing resources (e.g., computer networks, servers, storage, applications and services) which can be rapidly provisioned and released with minimal management effort. Cloud computing and storage solutions provide users and enterprises with various capabilities to store and process their data in either privately owned, or third-party data centers that may be located far from the user-ranging in distance from across a city to across the world. Cloud computing relies on sharing of resources to achieve coherence and economy of scale, similar to a utility (like the electricity grid) over an electricity network.

It is therefore an object of the present invention to provide a method and system for protecting IoT devices from malicious code.

It is another object of the present invention to provide a method and system that can protect IoT devices, that wereotherwise remained unprotected.

It is still another object of the present invention to provide such a system that can detect malicious code in IoT devices, provide an alert, and remove the malicious code.

It is still another object of the present invention to provide upgrades and updates to the operating systems of the IoT devices, whether these operating systems are standard, or proprietary.

Other objects and advantages of the invention will become apparent as the description proceeds.

SUMMARY OF THE INVENTION

The invention relates to a system for protecting IoT devices from malicaious code, which comprises: (a) a memory extracting module at each of said IoT devices, for extracting a copy of at least a portion of the memory content from the IoT device, and sending the same to an in-cloud server; and (b) an in-cloud server for receiving said memory content, and performing an integrity check for a possible existance of malicious code within said memory content.

In an embodiment of the Invention, said in-cloud server performs one or more of the following: (a) analysis of the memory to find malware using static analysis methods; analysis of the memory to find malicious behavior using behavioral and heuristics methods; (b) reconstruction of the state of an OS of the IoT to determine and report important structural elements; (c) check of the integrity of the OS and its memory to possibly find fault in the integrity or hidden processes; (d) a cross-view check on resources to find rootkits and hidden operations; and (e) a cross-view check and validation of memory contents of plurality of IoT devices.

In an embodiment of the invention, and following said integrity check, said in-cloud server performs one or more of the following:
  (1) logging of the results;
  (2) reporting the results, raising a warning or an alert in a case of detection of an unexpected code or behaveior; or
  (3) communicating and responding to an IoT request.

In an embodiment of the invention, the memory, a copy of which is sent to the in-cloud server, is either a persistent memory or a non-persistent memory.

In an embodiment of the invention, said memory extraction module is embedded within a kernel of a respective operating system of the IoT device.

In an embodiment of the invention, said memory extraction module is positioned within a trusted layer at the IoT device.

In an embodiment of the invention, said memory extraction module is positioned within a Trusted Execution Environment at the processor of the IoT device.

BRIEF DESCRIPTION OF THE DRAWINGS

In the drawings:

FIG. 1 illustrates the general structure of the system of the present invention.

DETAILED DESCRIPTION OF PREFERRED EMBODIMENTS OF THE INVENTION

As noted, there are many cases in which the classical techniques are not applicable for protecting IoT devices from damages of malicious codes. The present invention provides alternative system and method for protecting IoT devices.

FIG. 1 shows a general structure of the system of the present invention. The system comprises in general an in-cloud protection server 10, which is used to protect a plurality of remote IoT devices 20a-20n from malicious code. Several of the devices 20a-20n may be stand-alone devices, others may be a part of IoT networks. In general, the in-cloud server 10 may serve a very large number of IoT devices. For example, a single in-cloud server may serve hundreds of thouthands, even millions of IoT devices 20, that are spread along the globe.

Each of the devices 20a-20n comprises a memory extraction module 21a-21n, respectively. In one embodiment, the memory extraction module 21 is embedded within the kernel of the respective operating system of device 20. In another embodiment, the memory extraction module 21 is positioned within a trusted layer, such as hypervisor, at device 20. In still another embodiment, the memory extraction module may be positioned within a Trusted Execution Environment (TEE) at the processor of the IoT device.

The memory extraction modules 21 at each of the devices 20 extracts, either upon demand from server 10, or independently the memory content (persistent and/or non persistent), and transmits the same to the in-cloud server 10 for inspection and verification.

Upon receipt of the memory content (or a portion thereof) of a device 20 from a respective memory extraction module 21, the in-cloud server 10 performs one or more of the following operations:
(1) Analysis of the memory to find malware using static analysis methods;
(2) Analysis of the memory to find malicious behavior using behavioral and heuristics methods;
(3) Reconstruction of the state of the OS to determine and report important structural elements, such as:
  a. Process/thread list
  b. Communication ports
  c. Kernel modules
  d. Objects in memory
  e. Object in cache
  f. Open/close files
  g. System status
  h. Bootstrap information
  i. Memory corruptions
(4) Check of the integrity of the OS and its memory to find fault in the integrity or hidden processes;
(5) A cross-view check on resources to find rootkits and hidden operations. The cross-view collaborates with components as reported from within the OS; and.
(6) A cross-view check and validation of memory contents of plurality of IoT devices.

Following the above perations, the in-cloud server may perform one ore more of the following operations:
  (1) Logging of the results;
  (2) Reporting the results, raising a warning or an alert in a case of detection of an unexpected code or behaveior; or
  (3) Communicating and responding to an IoT request.

For its proper operation, server 10 has a database 11 that contains authentic and reliable data for comparison and verification with the memory content which is received from the IoT devices. For example, the database 11 may contain a copy of the authentic OS which is used in each IoT device 20 and its version number. The database content, whether relating to standard data or proprietary data, is accumulated by the operator of server 10, for example, by contacting the manufacturers of devices 20. The fact that a single server 10 can serve a huge number of devices 20 significantly reduces the costs of obtaining such data. Moreover, the communication between server 10 and devices 20 is typically performed over a secured channel 30. The system of the present invention also overcomes the problem which is associated with the typical IoT devices, namely the lack of sufficient processing power to perform the integrity check in the classical approach.

Server 10 may also perform an update of the OS of each of the IoT devices, when it becomes necessary. The integrity check and/or update may be performed from time to time, or periodically.

As shown, the in-cloud system of the present invention provides protection to IoT devices from damages resulting from malicious code. The system of the present invention provides such a protection in cases where the classical approach is either inapplicable (for example due to lack of sufficient processing power), or impractical (for example, due to the relatively high costs involved in providing of such protection).

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A system for protecting Internet of Things (IoT) devices, including IoT objects, representing connected devices having limited processing power, from malicious code, which comprises:
   an in-cloud server; and
   a memory extraction module at each of said IoT devices, for extracting a copy of at least a portion of memory content from a given IoT device, and sending said copy to said in-cloud server; wherein:
   said in-cloud server is operative for receiving and inspecting said extracted memory content;
   said memory extraction module is operative to extract, either upon demand from said in-cloud server, or independently, the copied portion of the memory content, and to transmit said extracted memory content to said in-cloud server for inspection and verification;
   said in-cloud server is operative to reconstruct, from said extracted memory content, a state of an operating system (OS) of the IoT device to determine and report results as to whether one or more structural elements of the OS have been compromised;
   said in-cloud server includes a database that contains authentic and reliable data for comparison and verification with the extracted memory content which is received from the IoT devices;
   said in-cloud server is operative to perform an analysis of the extracted memory content to find malware using static analysis methods; and
   said in-cloud server is operative to perform an analysis of extracted memory content to find malicious behavior using behavioral and heuristics methods.

2. A system according to claim 1, wherein said in-cloud server is adapted to perform one or more of the following additional operations:
   an integrity check of the OS and its memory to possibly find a fault in the integrity of the OS or in hidden processes;
   a cross-view check on resources to find root kits and hidden operations; and
   a cross-view check and validation of memory contents of a plurality of IoT devices.

3. A system according to claim 1, wherein following said operation to reconstruct, said in-cloud server performs one or more of the following:
   (1) logging of the results;
   (2) reporting the results, raising a warning or an alert in a case of detection of an unexpected code or behavior; and
   (3) communicating and responding to an IoT request.

4. A system according to claim 1, wherein the extracted memory content is either a persistent memory content or a non-persistent memory content.

5. A system according to claim 1, wherein said memory extraction module is embedded within a kernel of a respective operating system of the IoT device.

6. A system according to claim 1, wherein said memory extraction module is positioned within a trusted layer at the IoT device.

7. A system according to claim 1, wherein said memory extraction module is positioned within a Trusted Execution Environment at the processor of the IoT device.

8. A system according to claim 1, wherein the one or more structural elements are selected from the group consisting of:
   a. process/thread list;
   b. communication ports;
   c. kernel modules;
   d. objects in memory;
   e. object in cache;
   f. open/close files;
   g. system status;
   h. bootstrap information; and
   i. memory corruptions.

9. A system according to claim 1, wherein the OS of the IoT device is a proprietary OS.

10. A system according to claim 1, wherein the extracted memory content includes persistent and non-persistent memory content.

11. A system according to claim 2, wherein the fault is malicious code.

12. A system according to claim 2, wherein following one or more of the additional operations, said in-cloud server performs one or more of the following:
   (1) logging of results of the integrity check, the cross-view check on resources, or the cross-view check and validation of memory contents;
   (2) reporting the results of the integrity check, the cross-view check on resources, or the cross-view check and validation of memory contents, raising a warning or an alert in a case of detection of an unexpected code or behavior; or
   (3) communicating and responding to an IoT request.

* * * * *